(12) United States Patent
Kato et al.

(10) Patent No.: US 11,288,964 B2
(45) Date of Patent: Mar. 29, 2022

(54) DRIVING ASSISTANCE DEVICE AND DRIVING ASSISTANCE METHOD

(71) Applicant: TOYOTA JIDOSHA KABUSHIKI KAISHA, Toyota (JP)

(72) Inventors: Satoshi Kato, Toyota (JP); Nobuyuki Tomatsu, Toyota (JP); Yu Ito, Chita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/237,460

(22) Filed: Dec. 31, 2018

(65) Prior Publication Data
US 2019/0221125 A1 Jul. 18, 2019

(30) Foreign Application Priority Data

Jan. 18, 2018 (JP) .............................. JP2018-006250

(51) Int. Cl.
*G08G 1/16* (2006.01)
*B60W 30/09* (2012.01)
*B60W 30/095* (2012.01)
*G06K 9/00* (2022.01)

(52) U.S. Cl.
CPC ............. *G08G 1/162* (2013.01); *B60W 30/09* (2013.01); *B60W 30/0956* (2013.01); *G06K 9/00805* (2013.01); *G08G 1/166* (2013.01)

(58) Field of Classification Search
CPC ....... G08G 1/162; G08G 1/166; B60W 30/09; B60W 30/0956; G06K 9/00805
See application file for complete search history.

(56) References Cited

U.S. PATENT DOCUMENTS

| 6,169,940 B1 | 1/2001 | Jitsukata et al. |
| 6,975,997 B1 * | 12/2005 | Murakami .............. B60L 53/30 705/5 |
| 2007/0150134 A1 * | 6/2007 | Yamamoto ............. G08G 1/162 701/29.5 |

(Continued)

FOREIGN PATENT DOCUMENTS

| CN | 106463053 A | 2/2017 |
| CN | 107472243 A | 12/2017 |

(Continued)

*Primary Examiner* — Tyler J Lee
*Assistant Examiner* — Yufeng Zhang
(74) *Attorney, Agent, or Firm* — Oliff PLC (57) ABSTRACT

A driving assistance device that detects an object in a traveling direction of a vehicle and to assist avoiding a collision of the vehicle with the object, including: a decision unit that decides whether there is a possibility of the own vehicle colliding with the detected object; a creation unit that creates an action plan for the own vehicle to avoid colliding with the detected object; a transmission unit that transmits the action plan to another vehicle; a receiving unit that receives, from the other vehicle that received the action plan, a response including information on whether it is possible for the other vehicle to take an action to avoid colliding with the own vehicle; a determination unit that determines an action based on the action plan and the response from the other vehicle; and an execution unit that executes the action determined by the determination unit.

6 Claims, 6 Drawing Sheets

(56) References Cited

U.S. PATENT DOCUMENTS

| | | | |
|---|---|---|---|
| 2015/0228195 A1* | 8/2015 | Beaurepaire | B60Q 1/50 340/907 |
| 2017/0084174 A1 | 3/2017 | Suzuki | |
| 2017/0103651 A1* | 4/2017 | Rovik | G08G 1/096758 |
| 2017/0349173 A1 | 12/2017 | Nishiguchi et al. | |
| 2018/0056998 A1* | 3/2018 | Benosman | B60W 30/095 |
| 2018/0141492 A1 | 5/2018 | Tokuda et al. | |

FOREIGN PATENT DOCUMENTS

| | | |
|---|---|---|
| JP | H11-144185 A | 5/1999 |
| JP | 2016-215752 A | 12/2016 |

* cited by examiner

DRIVING ASSISTANCE DEVICE AND DRIVING ASSISTANCE METHOD

INCORPORATION BY REFERENCE

The disclosure of Japanese Patent Application No. 2018-006250 filed on Jan. 18, 2018 including the specification, drawings and abstract is incorporated herein by reference in its entirety.

BACKGROUND

1. Technical Field

The disclosure relates to a driving assistance device that is installed in a vehicle and that performs driving assistance for avoiding a collision of the vehicle and an object and a driving assistance method that the device executes.

2. Description of Related Art

Japanese Patent Application Publication No. 2016-215752 (JP 2016-215752 A) discloses a driving assistance device that notifies a moving body near one's own vehicle, such as another vehicle, of a direction in which the own vehicle will move in order to avoid colliding with an object, when there is possibility that the own vehicle will collide with the object detected in front of the own vehicle. In the driving assistance device, the possibility that the own vehicle collides with the other vehicle when the own vehicle takes action to avoid colliding with the object is minimized by carrying out the above notification.

SUMMARY

In the driving assistance device according to the JP 2016-215752 A above, the action of avoiding a collision with the object to be executed by the own vehicle is only one-sidedly notified to the other vehicle nearby. Thus, if the other vehicle does not notice that the notification of the collision avoidance action had been transmitted from the own vehicle, there is possibility that the own vehicle will collide with the other vehicle when the own vehicle takes action to avoid colliding with the object, for example.

The disclosure provides a driving assistance device and method that decreases the possibility of an own vehicle colliding with a moving body such as another vehicle nearby when the own vehicle takes action to avoid colliding with an object.

An aspect of the disclosure relates to a driving assistance device that detects an object in a traveling direction of a vehicle and that assists avoiding a collision of the vehicle with the object. The driving assistance device of the aspect includes: a decision unit that decides whether there is a possibility of an own vehicle colliding with the detected object; a creation unit that creates an action plan for the own vehicle to avoid colliding with the detected object when it is decided that there is the possibility of the own vehicle colliding with the detected object; a transmission unit that transmits the action plan to another vehicle within a prescribed area from the own vehicle; a receiving unit that receives, from the other vehicle that received the action plan, a response including information on whether it is possible for the other vehicle to take an action to avoid colliding with the own vehicle; a determination unit that determines an action to be taken by the own vehicle to avoid colliding with the detected object based on the action plan and the response from the other vehicle; and an execution unit that executes the action determined by the determination unit.

In the driving assistance device of the aspect, when the own vehicle attempts to avoid colliding with the object, the action plan for avoiding the collision of the own vehicle is transmitted in advance to the other vehicle near the own vehicle and the action plan that is actually to be executed by the own vehicle is determined based on the information transmitted from the other vehicle regarding the action plan. The own vehicle can carry out a driving assistance control based on the action plan in coordination with the other vehicle. Thus, the possibility that the own vehicle collides with the other vehicle when the own vehicle takes action to avoid colliding with the object is decreased.

Additionally, in the aspect, the creation unit may create a first action plan that involves moving to a different lane other than a traveling lane on which the own vehicle is traveling and a second action plan that does not involve moving to the different lane other than the traveling lane on which the own vehicle is traveling, the transmission unit may transmit the first action plan to the other vehicle within the prescribed area from the own vehicle, the receiving unit may receive, from the other vehicle that received the first action plan, information on whether it is possible for the other vehicle to take a collision avoidance action to avoid a collision with the own vehicle, as the response, and the determination unit may determine, based on the response from the other vehicle, the first action plan as the action to be taken by the own vehicle when all of the other vehicles are able to take a collision avoidance action, and the second action plan as the action to be taken by the own vehicle when at least one of the other vehicles is not able to take the collision avoidance action.

Through this control, the first action plan in which the other vehicles near the own vehicle is affected and the second action plan in which the other vehicles near the own vehicle is not affected are created, and it is determined which action plan can be executed based on the response from the other vehicles. Thus, it is possible to easily determine the collision avoidance action by just selecting one of the two action plans.

Additionally, in the aspect, the creation unit may create an own vehicle action plan that involves moving to a different lane other than a traveling lane on which the own vehicle is traveling, the transmission unit may transmit the own vehicle action plan to the other vehicle within a prescribed area from the own vehicle, the receiving unit may receive, from the other vehicle that received the own vehicle action plan, information on whether it is possible for the other vehicle to take a collision avoidance action to avoid a collision with the own vehicle and an other-vehicle action plan for avoiding the collision of the other vehicle with the own vehicle when it is possible, as the response, and the determination unit may determine, based on the response from the other vehicle, the own vehicle action plan as the action to be taken by the own vehicle when all of the other vehicles are able to take collision avoidance action and there is no interference in all of the other-vehicle action plans, and may determine an action plan in which the own vehicle action plan is modified and which is for avoiding a collision with the detected object and all of the other vehicles as the action to be taken by the own vehicle when otherwise.

Through this control, the action plan which affects the other vehicle near the own vehicle is created in advance, and it is determined based on the response from the other vehicle, whether the action plan is possible to be executed as it is or the action plan needs to be modified. Thus, the action plan created in advance is able to be modified to an optimum content according to the response from the other vehicle.

In the aspect, the different lane may be one of a lane in which a traveling direction is the same as that of the own vehicle and an opposite lane in which a traveling direction is the opposite of that of the own vehicle.

In the aspect, at least one of the decision unit, the creation unit, the transmission unit, the receiving unit, the determinations unit, and the execution unit may include an electronic control unit.

Another aspect of the disclosure relates to a driving assistance method executed by a computer device installed in a vehicle to assist avoiding a collision of the vehicle with an object. The driving assistance method according to the other aspect including the steps of: detecting the object in a traveling direction of the own vehicle; deciding whether there is a possibility of the own vehicle colliding with the detected object; creating an action plan for the own vehicle to avoid colliding with the detected object when it is decided that there is the possibility of the own vehicle colliding with the detected object; transmitting the action plan to another vehicle within a prescribed area from the own vehicle; receiving, from the other vehicle that received the action plan, a response including information on whether it is possible for the other vehicle to take an action to avoid colliding with the own vehicle; determining an action to be taken by the own vehicle to avoid colliding with the detected object based on the action plan and the response from the other vehicle; and executing the determined action.

In the driving assistance method according to the other aspect, when the own vehicle attempts to avoid colliding with the object, the action plan for avoiding the collision of the own vehicle is transmitted in advance to the other vehicle near the own vehicle and the action plan that is actually to be executed by the own vehicle is determined based on the information transmitted from the other vehicle regarding the action plan. Through this control method, the own vehicle can carry out a driving assistance control based on the action plan in coordination with the other vehicle. Thus, the possibility that the own vehicle collides with the other vehicle when the own vehicle takes action to avoid colliding with the object is decreased.

According to the aspects of the disclosure described above, the possibility that the own vehicle collides with the other vehicle when the own vehicle takes action to avoid colliding with the object is decreased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration

Figure 1:
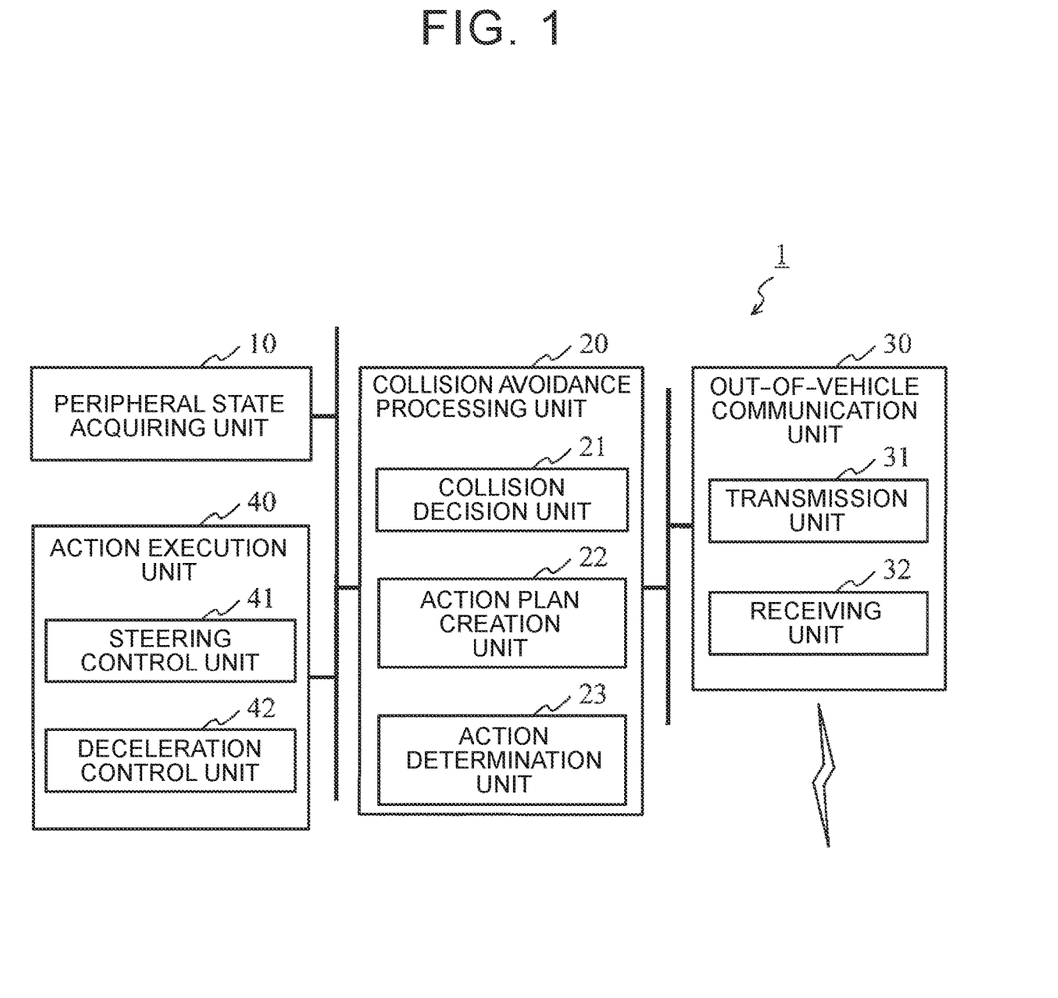
FIG. 1 is a diagram illustrating a schematic configuration of a driving assistance device according to an embodiment of the disclosure.

FIG. 1 is a diagram illustrating a schematic configuration of a driving assistance device 1 according to an embodiment of the disclosure. The driving assistance device 1 in FIG. 1 has a peripheral state acquiring unit 10, a collision avoidance processing unit 20 including a collision decision unit 21, an action plan creation unit 22, and an action determination unit 23, an out-of-vehicle communication unit 30 including a transmission unit 31 and a receiving unit 32, and an action execution unit 40 including a steering control unit 41 and a deceleration control unit 42. The driving assistance device 1 is installed in the vehicle.

The peripheral state acquiring unit 10 is configured to acquire various information for identifying a traveling state of the vehicle such as a position and speed of the vehicle and a state of objects (such as pedestrians, bicycles, preceding vehicles, parked vehicles, and on-road installations) near the vehicle to detect objects that affect traveling of the vehicle. For example, the various information includes image data taken by a camera (not shown) installed in the vehicle and signal wave data observed by millimeter wave radar, optical radar (Lidar), or ultrasonic sonar etc. (not shown). Based on the information, the peripheral state acquiring unit 10 can recognize a distance between the vehicle and the object, a direction of the object when viewed from the vehicle, and a space between the vehicle and the object to detect objects that affect traveling of the vehicle.

The collision decision unit 21 is configured to determine whether there is a possibility that the vehicle will collide with the object (hereinafter referred to as a "detected object") that is detected by the peripheral state acquiring unit 10 as an object that affects the traveling of the vehicle. The collision decision unit 21 is configured of a collision avoidance assistance electronic control unit (ECU) and a driving assistance ECU, for example.

The action plan creation unit 22 is configured to create an action plan for avoiding a collision of the vehicle with the detected object (collision avoidance action plan) when it is determined in the collision decision unit 21 that there is a possibility of the vehicle colliding with the detected object. The action plan creation unit 22 is configured of the collision avoidance assistance ECU and the driving assistance ECU, for example. The collision avoidance action plan will be described later.

The transmission unit 31 is configured to transmit the collision avoidance action plan created by the action plan creation unit 22 to a moving body such as a vehicle that differs from the own vehicle (hereinafter referred to as an "other vehicle") that exists near (within a prescribed area from the own vehicle) the vehicle (hereinafter referred to as an "own vehicle"). The transmission unit 31 is configured of a vehicle-to-vehicle communication ECU and a transmission antenna, for example.

The receiving unit 32 is configured to receive a prescribed response to the collision avoidance action plan from the other vehicle that received the collision avoidance action plan. The prescribed response includes information on whether it is possible for the other vehicle to take action to avoid colliding with the own vehicle. The prescribed response may include an action plan created in the other vehicle, in which the driving assistance device 1 is installed, for avoiding a collision with the own vehicle. The receiving unit 32 is configured of the vehicle-to-vehicle communication ECU and a receiving antenna, for example.

The action determination unit 23 is configured to determine an action to be taken by the own vehicle to avoid colliding with the detected object at least based on the collision avoidance action plan created by the action plan creation unit 22 and the information that is received by the receiving unit 32 on whether it is possible for the other vehicle to take action to avoid colliding with the own vehicle. The action determination unit 23 may also determine an action to be taken by the own vehicle to avoid colliding with the detected object based further on a collision avoidance action plan created by the other vehicle. The action determination unit 23 is configured of the collision avoidance assistance ECU and the driving assistance ECU, for example. A method in which the action to be taken by the own vehicle is determined will be described later. The action determination unit 23 sends a command of the determined action to the action execution unit 40.

The steering control unit 41 is configured to control steering of the own vehicle based on the command from the action determination unit 23. Specifically, the steering control unit 41 may control a timing of steering a steering device and a steering amount of the steering device. The steering control unit 41 is configured of a steering control ECU and a steering actuator, for example.

The deceleration control unit 42 is configured to decrease the speed of the own vehicle based on the command from the action determination unit 23. Specifically, the deceleration control unit 42 may control an operation timing of a brake pedal and a depression amount of the brake pedal. The deceleration control unit 42 is configured of a brake control ECU, a deceleration actuator, and a hybrid vehicle (HV) motor, for example.

Figure 2:
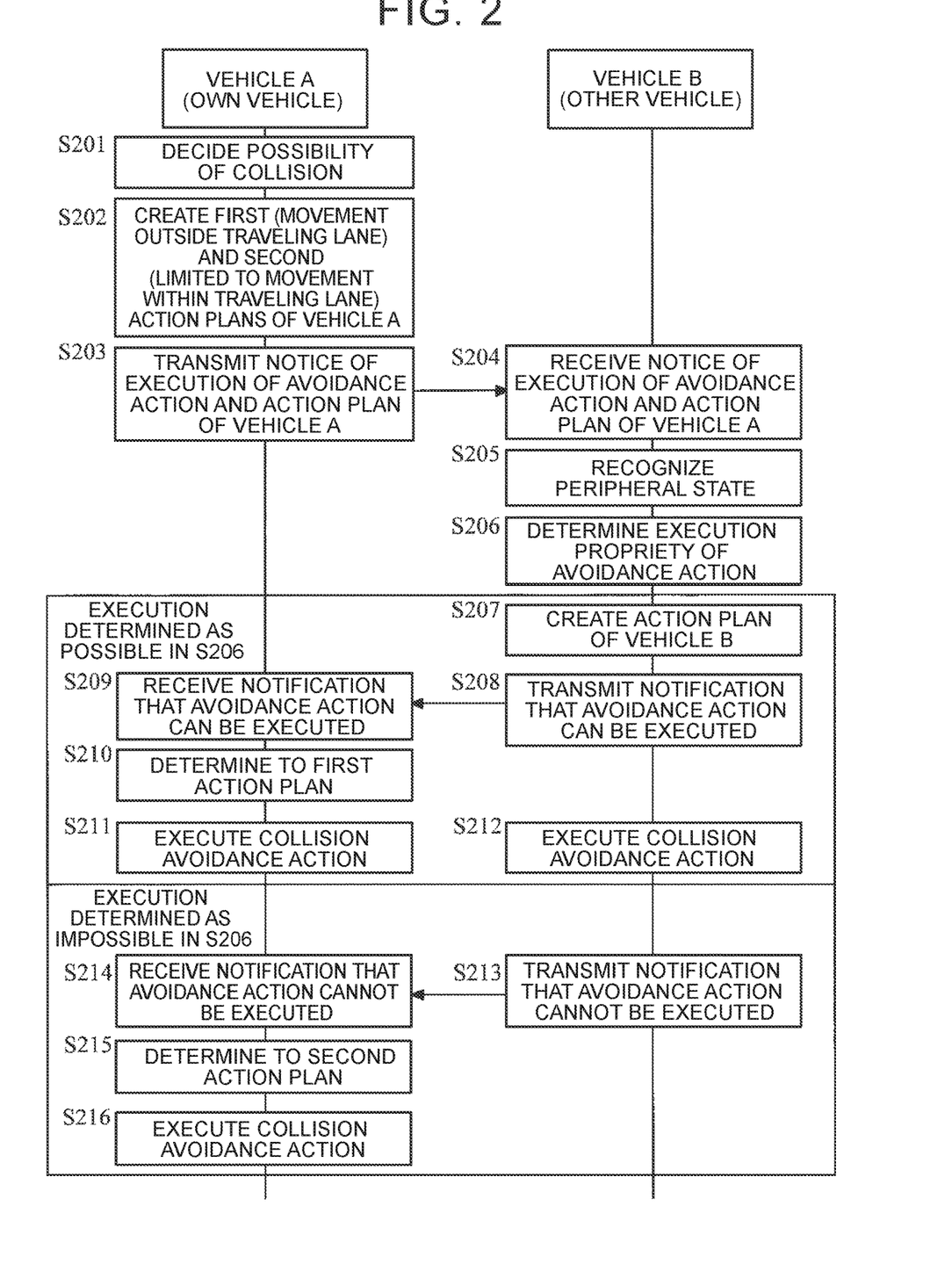
FIG. 2 is a sequence diagram illustrating a collision avoidance control of a first example executed by the driving assistance device.
Figure 3:
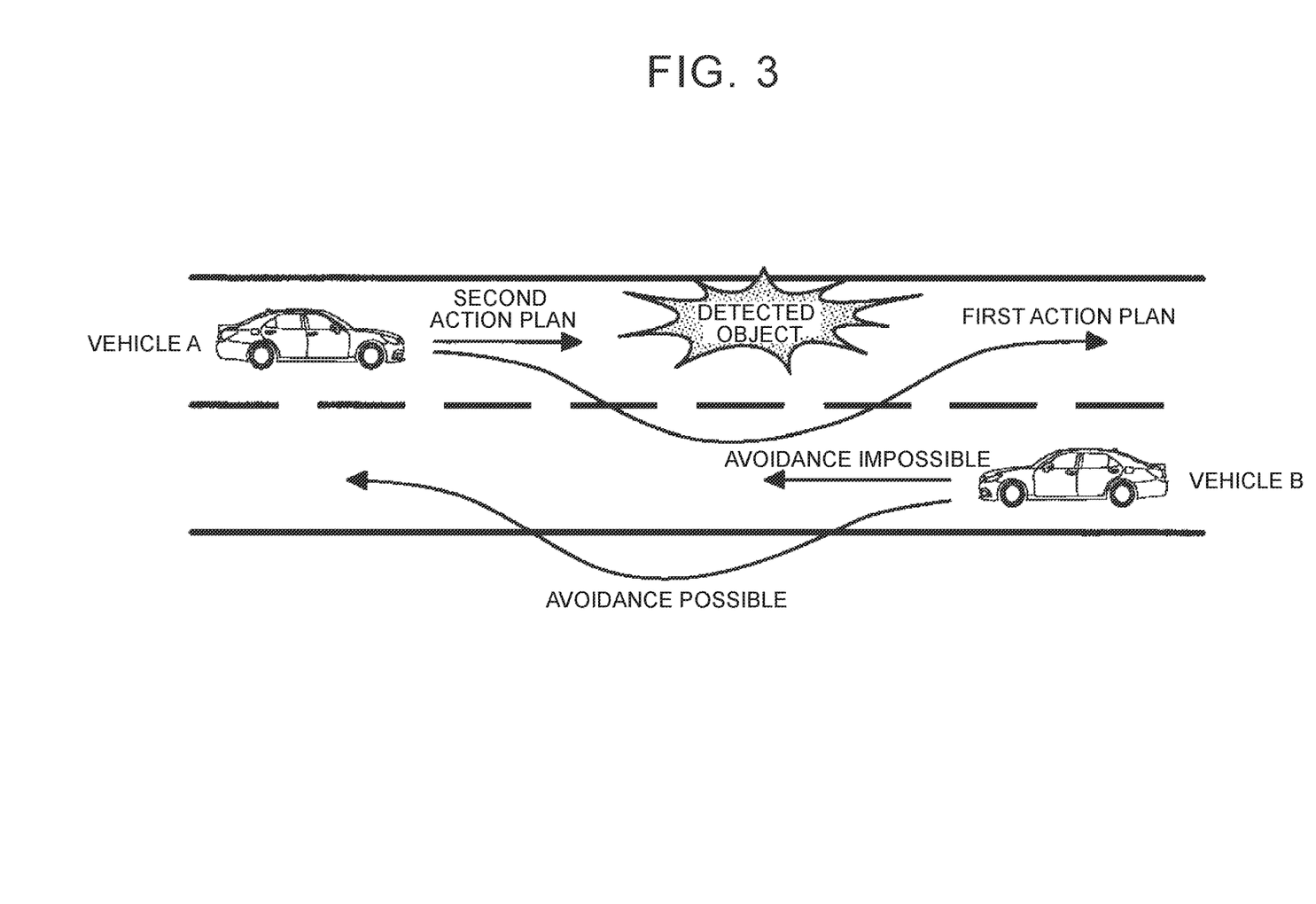
FIG. 3 is a diagram simply illustrating a behavior of a vehicle based on the collision avoidance control according to the first example.

The electronic control unit (ECU) described above is typically configured including a central processing unit (CPU), a memory, and an input/output interface etc. The ECU achieves a prescribed function by having the CPU read and execute a prescribed program stored in the memory.
Control Next, the driving assistance method executed by the driving assistance device 1 according to the embodiment of the disclosure will be described with reference to FIGS. 2 to 5B. A case in which collision avoidance control is executed between the driving assistance device 1 of a vehicle A serving as the own vehicle and the driving assistance device 1 of a vehicle B serving as the other vehicle, will be described below.
First Example FIG. 2 is a sequence diagram illustrating a processing routine of the collision avoidance control of a first example. The collision avoidance control in the first example is initiated with the object that affects traveling of the vehicle being detected by the peripheral state acquiring unit 10 of the vehicle A. FIG. 3 is a diagram simply illustrating the behaviors of the vehicles A and B based on the collision avoidance control according to the first example.

Step S201: The collision decision unit 21 of the vehicle A decides whether there is a possibility that the vehicle A will collide with the detected object. If there is a possibility of a collision, the processing will move on to step S202. If there is no possibility of a collision, the following processing will be suspended.

Step S202: The action plan creation unit 22 of the vehicle A creates two plans as the collision avoidance action plan for the vehicle A which are an action plan that involves moving to a different lane other than the traveling lane on which the vehicle A is traveling (hereinafter referred to as a "first action plan") and an action plan that does not involve moving to a different lane other than the traveling lane on which the vehicle A is traveling and that limits the movement of the vehicle A to a movement within the traveling lane (hereinafter referred to as a "second action plan"). The different lane may be a lane in which a traveling direction is the same as that of the own vehicle (multiple lanes per side) or may be an opposite lane in which a traveling direction is the opposite of that of the own vehicle.

Step S203: The transmission unit 31 of the vehicle A transmits to the vehicle B near the vehicle A, a notice that the collision avoidance action will be executed thereafter and the first action plan that was created by the action plan creation unit 22.

Step S204: The receiving unit 32 of the vehicle B receives from the vehicle A, the notice that the collision avoidance action will be executed and the first action plan.

Step S205: The peripheral state acquiring unit 10 of the vehicle B recognizes a state of an object (the presence of a detected object, a direction of the object when viewed from the vehicle B, and a distance and space between the object and the vehicle B) near the vehicle B in response to receiving the notice that the collision avoidance action will be executed by the vehicle A.

Step S206: The collision decision unit 21 of the vehicle B decides whether it is possible for the vehicle B to execute an action of avoiding a collision with the vehicle A (collision avoidance action) without colliding with the detected object based on the peripheral state recognized in step S205. If the collision avoidance action can be executed, the processing will move on to step S207. If the collision avoidance action cannot be executed, the processing will move on to step S213.

Step S207: If the collision avoidance action can be executed, the action plan creation unit 22 of the vehicle B creates, as a collision avoidance action plan for the vehicle B, an action plan for avoiding a collision with the vehicle A without colliding with the detected object.

Step S208: The transmission unit 31 of the vehicle B transmits to the vehicle A, a notification that the vehicle B can execute the collision avoidance action.

Step S209: The receiving unit 32 of the vehicle A receives from the vehicle B, the notification that the vehicle B can execute the collision avoidance action.

Step S210: Since the vehicle B can execute the collision avoidance action, the action determination unit 23 of the vehicle A determines, as the collision avoidance action plan to be taken by the own vehicle, the first action plan created in step S202 that involves the own vehicle moving to the different lane other than the traveling lane.

Step S211: The action execution unit 40 of the vehicle A executes the action for avoiding a collision of the vehicle A with the detected object based on the first action plan.

Step S212: The action execution unit 40 of the vehicle B executes an action for avoiding a collision of the vehicle B with the vehicle A without colliding with the detected object based on the action plan for the vehicle B created in step S207.

Step S213: If the collision avoidance action cannot be executed, the transmission unit 31 of the vehicle B transmits a notification to the vehicle A that the vehicle B cannot execute the collision avoidance action.

Step S214: The receiving unit 32 of the vehicle A receives the notification from the vehicle B that the vehicle B cannot execute the collision avoidance action.

Step S215: Since the vehicle B cannot execute the collision avoidance action, the action determination unit 23 of the vehicle A determines, as the collision avoidance action plan to be taken by the own vehicle, the second action plan created in step S202 that does not involve the vehicle A moving to a different lane other than the traveling lane and that limits the movement of the vehicle A to a movement within the traveling lane.

Step S216: The action execution unit 40 of the vehicle A executes the action for avoiding a collision of the vehicle A with the detected object based on the second action plan.

Second Example

Figure 4:
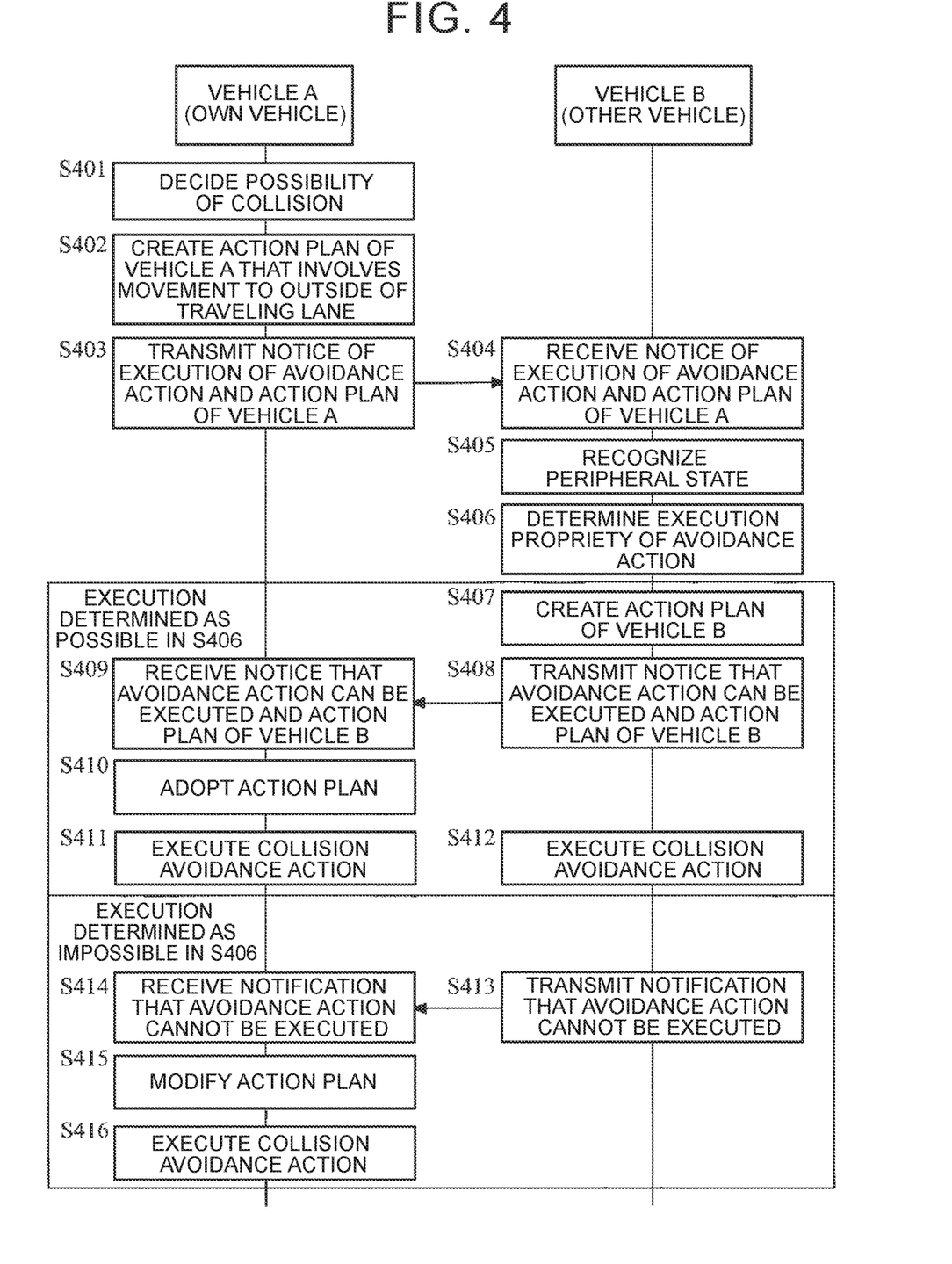
FIG. 4 is a sequence diagram illustrating a collision avoidance control of a second example executed by the driving assistance device.

FIG. 4 is a sequence diagram illustrating a processing routine of the collision avoidance control of a second example. The collision avoidance control in the second example is initiated with the object that affects traveling of the vehicle being detected by the peripheral state acquiring unit 10 of the vehicle A.

Step S401: The collision decision unit 21 of the vehicle A decides whether there is a possibility that the vehicle A will collide with the detected object. If there is a possibility of a collision, the processing will move on to step S402. If there is no possibility of a collision, the following processing will be suspended.

Step S402: The action plan creation unit 22 of the vehicle A creates as the collision avoidance action plan for the vehicle A, an action plan that involves moving to a different lane other than the traveling lane on which the vehicle A is traveling (hereinafter referred to as an "own vehicle action plan").

Step S403: The transmission unit 31 of the vehicle A transmits to the vehicle B near the vehicle A, a notice that the collision avoidance action will be executed thereafter and the own vehicle action plan that was created by the action plan creation unit 22.

Step S404: The receiving unit 32 of the vehicle B receives from the vehicle A, the notice that the collision avoidance action will be executed and the own vehicle action plan.

Step S405: The peripheral state acquiring unit 10 of the vehicle B recognizes a state of an object near the vehicle B (the presence of a detected object, a direction of the object when viewed from the vehicle B, and a distance and space between the object and the vehicle B) in response to receiving the notice that the collision avoidance action will be executed by the vehicle A.

Step S406: The collision decision unit 21 of the vehicle B decides whether it is possible for the vehicle B to execute the action of avoiding a collision with the vehicle A (collision avoidance action) without colliding with the detected object based on the peripheral state recognized in step S405. If the collision avoidance action can be executed, the processing will move on to step S407. If the collision avoidance action cannot be executed, the processing will move on to step S413.

Step S407: If the collision avoidance action can be executed, the action plan creation unit 22 of the vehicle B creates, as the collision avoidance action plan for the vehicle B, an action plan for avoiding a collision with the vehicle A without colliding with the detected object (hereinafter referred to as an "other-vehicle action plan").

Step S408: The transmission unit 31 of the vehicle B transmits to the vehicle A, a notification that the vehicle B can execute the collision avoidance action and the other-vehicle action plan.

Step S409: The receiving unit 32 of the vehicle A receives from the vehicle B, the notification that the vehicle B can execute the collision avoidance action and the other-vehicle action plan.

Step S410: Since the vehicle B can execute the collision avoidance action, the action determination unit 23 of the vehicle A adopts (determines), as the collision avoidance action plan to be taken by the own vehicle, the own vehicle action plan created in step S402 that involves the own vehicle moving to a different lane other than the traveling lane.

Step S411: The action execution unit 40 of the vehicle A executes the action for avoiding a collision of the vehicle A with the detected object based on the own vehicle action plan.

Step S412: The action execution unit 40 of the vehicle B executes the action for avoiding a collision of the vehicle B with the vehicle A without colliding with the detected object based on the other-vehicle action plan created in step S407.

Step S413: If the collision avoidance action cannot be executed, the transmission unit 31 of the vehicle B transmits a notification to the vehicle A that the vehicle B cannot execute the collision avoidance action.

Step S414: The receiving unit 32 of the vehicle A receives the notification from the vehicle B that the vehicle B cannot execute the collision avoidance action.

Step S415: Since the vehicle B cannot execute the collision avoidance action, the action determination unit 23 of the vehicle A determines, as the collision avoidance action to be taken by the own vehicle, a new action plan in which the own vehicle action plan created in step S402 is modified so that the possibility of the vehicle A avoiding a collision with the detected object and the other vehicle B is increased.

Step S416: The action execution unit 40 of the vehicle A executes the action for avoiding a collision of the vehicle A with the detected object based on the new action plan of the vehicle A that was modified in step S415.

Third Example

Figure 5A:
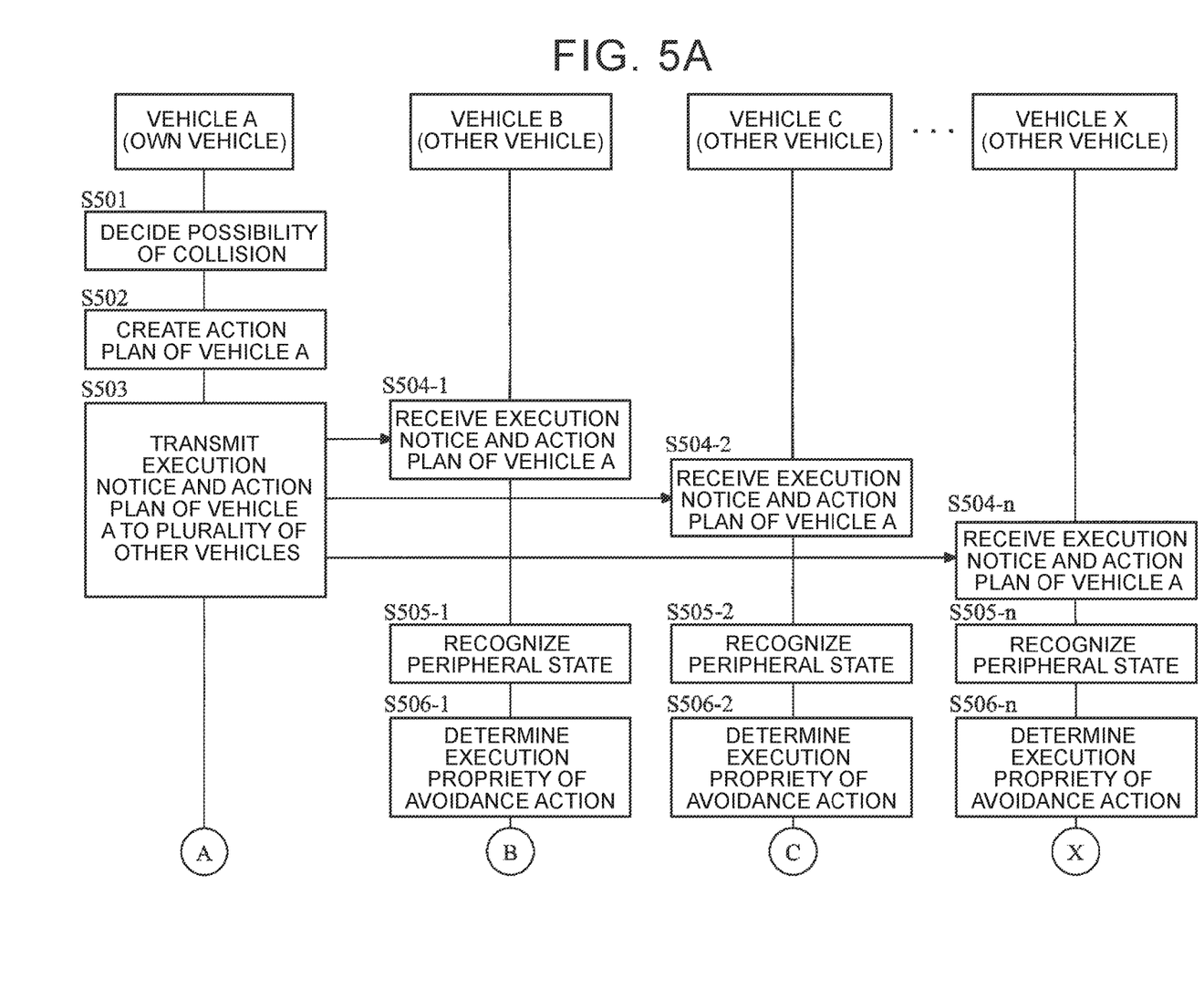
FIG. 5A is a sequence diagram illustrating a collision avoidance control of a third example executed by the driving assistance device.
Figure 5B:
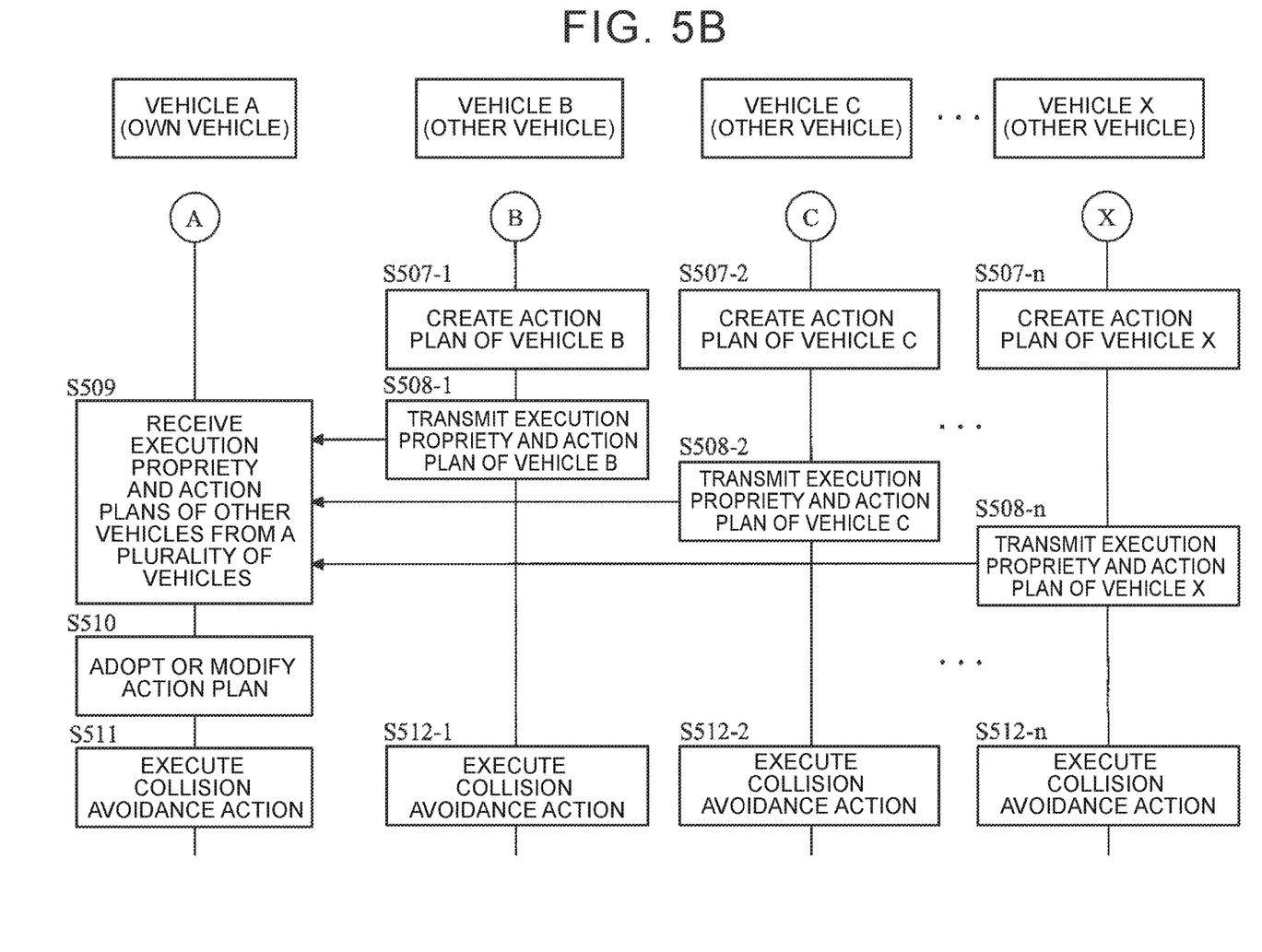
FIG. 5B is a sequence diagram illustrating a collision avoidance control of the third example executed by the driving assistance device.

FIGS. 5A and 5B are sequence diagrams illustrating a collision avoidance control of a third example executed by the driving assistance device. The third example describes a case in which the vehicle A performs collision avoidance control with a plurality of the other vehicles (the vehicle B, a vehicle C, . . . , and a vehicle X).

Step S501: The collision decision unit 21 of the vehicle A decides whether there is a possibility that the vehicle A will collide with the detected object. If there is a possibility of a collision, the processing will move on to step S502. If there is no possibility of a collision, the following processing will be suspended.

Step S502: The action plan creation unit 22 of the vehicle A creates, as the collision avoidance action plan for vehicle A, an action plan that involves moving to a different lane other than the traveling lane on which the vehicle A is traveling (hereinafter referred to as the "own vehicle action plan").

Step S503: The transmission unit 31 of the vehicle A transmits to the vehicle B, the vehicle C, . . . , and the vehicle X near the vehicle A, a notice that the collision avoidance action plan will be executed thereafter and the own vehicle action plan created by the action plan creation unit 22.

Steps S504-1 to S504-n: Each of the receiving units 32 of the vehicle B, the vehicle C, . . . , the vehicle X receive from the vehicle A, the notice that the collision avoidance action plan will be executed and the own vehicle action plan. The variable n is a value according to the number of the other vehicles.

Steps S505-1 to S505-n: Each of the peripheral state acquiring units 10 of the vehicle B, the vehicle C, . . . , and the vehicle X recognize a state of an object (the presence of a detected object, a direction of the object when viewed each of from the other vehicles, and a distance and space between the object and each of the other vehicles) near each of the other vehicles (the vehicle B, the vehicle C, . . . , and the vehicle X) in response to receiving the notice that the collision avoidance action will be executed by the vehicle A.

Steps S506-1 to S506-n: Each of the collision decision units 21 of the vehicle B, the vehicle C, . . . , and the vehicle X decide whether it is possible for each of the other vehicles (the vehicle B, the vehicle C, . . . , and the vehicle X) to execute an action of avoiding a collision with the vehicle A (collision avoidance action) without colliding with each of the detected objects based on the peripheral state recognized in steps S505-1 to S505-n respectively. If the collision avoidance action can be executed by each of the other vehicles, the processing will move on to steps S507-1 to S507-n respectively. If the collision avoidance action cannot be executed by each of the other vehicles, the processing will move on to steps S508-1 to S508-n respectively.

Steps S507-1 to S507-n: The action plan creation units 22 of the other vehicles that can execute the collision avoidance action create a collision avoidance action plan for avoiding a collision with the vehicle A without colliding with the corresponding detected object (hereinafter referred to as an "other-vehicle action plan").

Steps S508-1 to S508-n: The transmission units 31 of the vehicle B, the vehicle C, . . . , and the vehicle X transmit to the vehicle A, an execution propriety of the collision avoidance action determined in steps S506-1 to S506-n. The transmission units 31 of the vehicle B, the vehicle C, . . . , and the vehicle X transmit the other-vehicle action plans to the vehicle A if the other-vehicle action plans are created in steps S507-1 to S507-n.

Step S509: The receiving unit 32 of the vehicle A receives the execution propriety of the collision avoidance action of each of the other vehicles and the other-vehicle action plans from the vehicle B, the vehicle C, . . . , and the vehicle X, if created.

Step S510: The action determination unit 23 of the vehicle A determines the action plan to be taken by the own vehicle as the collision avoidance action as follows.

When all of the vehicle B, the vehicle C, . . . , and the vehicle X can execute the collision avoidance action and there is no interference in all of the other-vehicle action plans, the action determination unit 23 of the vehicle A adopts (determines), as the collision avoidance action plan to be taken by the own vehicle, the own vehicle action plan created in step S502 that involves the own vehicle moving to a different lane other than the traveling lane. When there is interference in any of the other-vehicle action plans even if all of the vehicle B, the vehicle C, . . . , and the vehicle X can execute the collision avoidance action, or when not all of the vehicle B, the vehicle C, . . . , and the vehicle X can execute the collision avoidance action, the action determination unit 23 of the vehicle A determines, as the collision avoidance action to be taken by the own vehicle, a new action plan in which the own vehicle action plan is modified so that the possibility of the vehicle A avoiding a collision with the detected object and the other vehicle B, the vehicle C, . . . , the vehicle X is increased. The interference in the action plans means a case in which traveling routes of two or more vehicles overlap with each other at a certain time, for example.

Step S511: The action execution unit 40 of the vehicle A executes an action for avoiding a collision of the vehicle A with the detected object based on the own vehicle action plan that was adopted or modified in step S510.

Steps S512-1 to S512-n: If the other-vehicle action plans are created in steps S507-1 to S507-n, the action execution units 40 of the vehicle B, the vehicle C, . . . , the vehicle X execute an action for avoiding a collision with the vehicle A without having the vehicle B, the vehicle C, . . . , the vehicle X collide with the corresponding detected object.

If the vehicle A executes collision avoidance control with the other vehicles (the vehicle B, the vehicle C, . . . , the vehicle X), the action determination unit 23 of the vehicle A can also make a similar determination to that in the first example. That is, when all of the vehicle B, the vehicle C, . . . , the vehicle X can execute the collision avoidance action, the action determination unit 23 of the vehicle A determines that the collision avoidance action plan to be taken by the own vehicle is the first action plan. When at least one of the other vehicles cannot execute the collision avoidance action, the action determination unit 23 of the vehicle A determines that the collision avoidance action plan to be taken by the own vehicle is the second action plan.

Operation and Effects of the Embodiment

In the driving assistance device and method according to the embodiment of the disclosure described above, when the own vehicle attempts to avoid colliding with the detected object, the collision avoidance action plan of the own vehicle is transmitted in advance to the moving body such as the other vehicle near the own vehicle and the action plan that is to be actually executed is determined based on information transmitted from the other vehicle regarding the collision avoidance action plan.

Through this control, the own vehicle can carry out a driving assistance control based on the action plan in coordination with the other vehicle. Thus, the possibility that the own vehicle collides with the other vehicle when the own vehicle takes action to avoid colliding with the object is decreased.

For example, when the first action plan that involves the own vehicle moving to a different lane other than the traveling lane and the second action plan that does not involve the own vehicle moving to a different lane other than the traveling lane are created in advance, and the first action plan is transmitted to the other vehicles, the first action plan can be adopted if all of the other vehicles can take collision avoidance action, and the second action plan can be adopted when otherwise. Thus, the collision avoidance action can be easily determined.

When the action plan that involves the own vehicle moving to a different lane other than the traveling lane is created in advance, and the action plan is transmitted to the other vehicles, the action plan created in advance can be adopted if all of the other vehicles can take collision avoidance action and there is no interference in all of the other-vehicle action plans, and the action plan created in advance can be modified and then adopted when otherwise. Thus, the optimum action plan according to the response from the other vehicles can be determined. Additionally, since there only needs to be one action plan created in advance, the load of calculation by the action plan creation unit 22 can be decreased.

The driving assistance device and method of the disclosure can be used in vehicles and are useful when the own vehicle needs to avoid colliding with the other vehicles nearby when the own vehicle takes action to avoid colliding with the object.

What is claimed is:

1. A driving assistance device that detects an object in a traveling direction of a vehicle and that assists avoiding a collision of the vehicle with the object, comprising:
   a transmitter;
   a receiver; and
   an electronic control unit that is configured to:
      decide whether there is a possibility of an own vehicle colliding with the object;
      create an action plan for the own vehicle to avoid colliding with the object when it is decided that there is the possibility of the own vehicle colliding with the object;
      transmit via the transmitter the action plan to another vehicle within a prescribed area from the own vehicle, wherein the own vehicle is traveling in a first lane and in a first direction and the another vehicle is traveling in a second lane different than the first lane and in a second direction opposite to the first direction;
      receive via the receiver, from the another vehicle that received the action plan, a binary response whether it is possible for the another vehicle to take an action to avoid colliding with the own vehicle;
      determine an action to be taken by the own vehicle to avoid colliding with the object based on the action plan and the binary response from the another vehicle; and
      execute the action that is determined, wherein:
         the own vehicle determines the action plan for the own vehicle when the another vehicle can execute the action to avoid colliding with the own vehicle, and
         the own vehicle determines a new action plan in which the action plan is modified so that a possibility of the own vehicle avoiding a collision with the object and the another vehicle is increased, when the another vehicle cannot execute the action to avoid colliding with the own vehicle.

2. The driving assistance device according to claim 1, wherein the electronic control unit is configured to:
   create a first action plan that involves moving to a different lane other than the first lane on which the own vehicle is traveling and a second action plan that does not involve moving to the different lane other than the first lane on which the own vehicle is traveling;
   transmit via the transmitter the first action plan to the another vehicle within the prescribed area from the own vehicle;
   receive via the receiver, from the another vehicle that received the first action plan, information on whether it is possible for the another vehicle to take a collision avoidance action to avoid a collision with the own vehicle, as the binary response; and
   determine, based on the binary response from the another vehicle, the first action plan as the action to be taken by the own vehicle when other vehicles are able to take the collision avoidance action, and the second action plan as the action to be taken by the own vehicle when at least one of the other vehicles are not able to take the collision avoidance action.

3. The driving assistance device according to claim 1, wherein the electronic control unit is configured to:
   create an own vehicle action plan that involves moving to a different lane other than the first lane on which the own vehicle is traveling;
   transmit via the transmitter, the own vehicle action plan to the another vehicle within a prescribed area from the own vehicle;
   receive via the receiver, from the another vehicle that received the own vehicle action plan, information on whether it is possible for the another vehicle to take a collision avoidance action to avoid a collision with the own vehicle and an other-vehicle action plan for avoiding the collision of the another vehicle with the own vehicle when it is possible, as the binary response; and
   determine, based on the binary response from the another vehicle, the own vehicle action plan as the action to be taken by the own vehicle when other vehicles are able to take the collision avoidance action and there is no interference in other-vehicle action plans, and determine an action plan in which the own vehicle action plan is modified and which is for avoiding a collision with the object and all of the other vehicles as the action to be taken by the own vehicle when otherwise.

4. The driving assistance device according to claim 2, wherein the different lane is one of a lane in which a traveling direction is the same as that of the own vehicle and an opposite lane in which a traveling direction is the opposite of that of the own vehicle.

5. The driving assistance device according to claim 3, wherein the different lane is one of a lane in which a traveling direction is the same as that of the own vehicle and an opposite lane in which a traveling direction is the opposite of that of the own vehicle.

6. A driving assistance method executed by a computer device installed in a vehicle to assist avoiding a collision of the vehicle with an object, comprising the steps of:
   detecting the object in a traveling direction of the vehicle;
   deciding whether there is a possibility of an own vehicle colliding with the object;
   creating an action plan for the own vehicle to avoid colliding with the object when it is decided that there is the possibility of the own vehicle colliding with the object;
   transmitting the action plan to another vehicle within a prescribed area from the own vehicle, wherein the own vehicle is traveling in a first lane and in a first direction and the another vehicle is traveling in a second lane different than the first lane and in a second direction opposite to the first direction;
   receiving, from the another vehicle that received the action plan, a binary response whether it is possible for the another vehicle to take an action to avoid colliding with the own vehicle;
   determining an action to be taken by the own vehicle to avoid colliding with the object based on the action plan and the binary response from the another vehicle; and
   executing the action that is determined, wherein:
      the own vehicle determines the action plan for the own vehicle when the another vehicle can execute the action to avoid colliding with the own vehicle, and
      the own vehicle determines a new action plan in which the action plan is modified so that a possibility of the own vehicle avoiding a collision with the object and the another vehicle is increased, when the another vehicle cannot execute the action to avoid colliding with the own vehicle.

* * * * *